(12) United States Patent
Hariharasubrahmanian et al.

(10) Patent No.: US 11,074,248 B2
(45) Date of Patent: Jul. 27, 2021

(54) MAP OF OPERATIONS FOR INGESTING EXTERNAL DATA

(71) Applicant: Oracle International Corporation, Redwood Shores, CA (US)

(72) Inventors: Shrikumar Hariharasubrahmanian, Palo Alto, CA (US); Michael Delorimier, Belmont, CA (US); Jarod Wen, Hollis, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 290 days.

(21) Appl. No.: 16/371,073

(22) Filed: Mar. 31, 2019

(65) Prior Publication Data
US 2020/0311063 A1    Oct. 1, 2020

(51) Int. Cl.
*G06F 7/00*       (2006.01)
*G06F 16/242*     (2019.01)
(Continued)

(52) U.S. Cl.
CPC ...... *G06F 16/2423* (2019.01); *G06F 16/2471* (2019.01); *G06F 16/24573* (2019.01); *G06F 16/252* (2019.01)

(58) Field of Classification Search
CPC ............. G06F 16/252; G06F 16/24573; G06F 16/2423; G06F 16/2471
(Continued)

(56) References Cited

U.S. PATENT DOCUMENTS

| 9,477,731 B2 | 10/2016 | Kornacker et al. |
| 10,210,585 B2 | 2/2019 | Allbright |

(Continued)

FOREIGN PATENT DOCUMENTS

| CN | 102999660 B | 3/2013 |
| CN | 108319652 A | 7/2018 |

OTHER PUBLICATIONS

Zheng et al., "Opaque: An Oblivious and Encrypted Distributed Analytics Platform", dated Mar. 2017, 17 pages.
(Continued)

*Primary Examiner* — Md I Uddin
(74) *Attorney, Agent, or Firm* — Hickman Becker Bingham Ledesma LLP

(57) ABSTRACT

Techniques are described for generating a map of operations to ingest external data. In an embodiment, DBMS receives a query schema that specifies an external data source and client-defined columns to arrange queried data from data fields of the external data source. DBMS generates an ingest schema for the queried data of the external data source such that the ingest schema specifies ingest data fields from the data fields of the external data source to be mapped to the one or more client-defined columns. Additionally, the DBMS identifies surplus data in the external data source, which has not been specified by the ingest schema and is different from the queried data defined by the client-requested query schema. The process not only ingests the ingest data fields from the external data source but also the surplus data from the external data source. In response to receiving a query according to a different query schema, DBMS generates a result set that based on the surplus data of the external data source. The result generation is based on the DBMS generating a map of operations, which when performed, generates a result set for the received query
(Continued)

regardless whether the query is based on the different query schema.

20 Claims, 8 Drawing Sheets

(51) Int. Cl.
    *G06F 16/25*     (2019.01)
    *G06F 16/2457*     (2019.01)
    *G06F 16/2458*     (2019.01)

(58) Field of Classification Search
    USPC .......................... 707/728, 759, 803, 999.102
    See application file for complete search history.

(56) References Cited

U.S. PATENT DOCUMENTS

| | | | |
|---|---|---|---|
| 10,645,548 B2* | 5/2020 | Reynolds | H04L 63/08 |
| 2014/0201244 A1 | 7/2014 | Zhou | |
| 2014/0279960 A1 | 9/2014 | Marwah et al. | |
| 2017/0193019 A1 | 7/2017 | Alsubaiee et al. | |
| 2019/0354559 A1* | 11/2019 | Sabhanatarajan | G06F 16/901 |
| 2020/0026710 A1* | 1/2020 | Przada | G06F 16/254 |
| 2020/0125751 A1 | 4/2020 | Hariharasubrahmanian | |

OTHER PUBLICATIONS

Wikibooks, "Fundamentals of Information Systems Security/Access Control Systems" last reviewed on May 30, 2019, 28 pages.
Twitter Blog, "Dremel Made Simple with Parquet", dated Sep. 11, 2013, 12 pages.
Seiler, Klaus, "Effective data exploration via columnar data formats like Parquet", last viewed on Oct. 18, 2019, 9 pages.
Papadimitriou et al., "Big Data Analytics over Encrypted Datasets with Seabed", dated 2016, 16 pages.
Melnik et al., "Dremel: Interactive Analysis of WebScale Datasets", Proceedings of the VLDB Endowment, vol. 3, No. 1 Copyright 2010, 10 pages.
Killourhy et al., "Toward Realistic and Artifact-Free Insider-Threat Data", 23rd Annual Computer Security Applications Conference, dated 2007, 10 pages.
Google Cloud, "Access control lists (ACLs)", https://cloud.google.com/storage/docs/access-control/lists, last viewed on Oct. 18, 2019, 13 pages.
GitHub, "Parquet", https://github.com/apache/parquet-format/blob/f1de77d31936f4d50f1286676a0034b6339918ee/README.md, dated Oct. 16, 2017, 9 pages.
Gershinsky et al., "Efficient Spark Analytics on Encrypted Data", dated Jun. 2018, 30 pages.
Gaddam, Ajit, "Securing Your Big Data Environment", Black Hat USA dated 2015, 8 pages.
Dijcks, Jean-Pierre, "Just add Magic-Performance and Security in File Based Systems" dated Nov. 22, 2017, 8 pages.
Design Specification Enterprise Parquet, File Wire-Format v0.5, dated Sep. 27, 2018, 23 pages.
Amazon Simple Storage Service, "Access Control List (ACL) Overview", https://docs.aws.amazon.com/AmazonS3/latest/dev/acl-overview.html, last viewed on Oct. 18, 2019, 8 pages.
Amazon Athena, "Converting to Columnar Formats", https://docs.aws.amazon.com/athena/latest/ug/convert-to-columnar.html, last viewed on Oct. 18, 2019, 6 pages.

* cited by examiner

MAP OF OPERATIONS FOR INGESTING EXTERNAL DATA

FIELD OF THE TECHNOLOGY

The present invention relates to the field of electronic database management, in particular to map of operations for ingesting external data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Various types of database management systems (DBMS) exist that provide data in response to queries received from client applications. A query generally specifies target data on which the operations requested in the query are performed. For example, the query may specify a data source, such as a data file, and a database object, such as a table, LOB, BLOB, which is to be selected or updated. To execute the query, the DBMS has to process the target data source in a way to enable the requested operations of the query to be executed on the target data of the target data source. In some instances, the data source for the data is not native to the DBMS processing the query, for example, an SQL statement is querying for data in an external XML file. In such instances, the storage format of the target data source differs from the format of the target data necessary for the query engine of the DBMS to process.

The challenge is to adapt the schema for storage format in storage to the schema expected by a particular query in a particular query engine of a variety of DBMS types. One approach is to avoid the problem by obtaining apriori standardization of the ingest schema. For example, if the load is for a CSV file, the process extracts the field values based on comma separation, transforms each data entry into the corresponding type (e.g., removing leading zeros and typecasting into an integer) and loads into logical container (e.g., data blocks), which can be processed by the query engine.

The term "extract, transform and load" (ETL) (or "ingesting" for the convenience of reference) refers herein to the above-described process of converting data from storage format/schema into a queryable format/schema of the query engine, a query schema.

The query engine specific, apriori schema is proving to be rigid and inadequate because the schema lacks information that may be useful for more accurate results to the issued queries, especially for queries that use different query schema for the data source.

BRIEF DESCRIPTION OF THE DRAWINGS

In the drawings of certain embodiments in which like reference numerals refer to corresponding parts throughout the figures.

DETAILED DESCRIPTION

Figure 1:
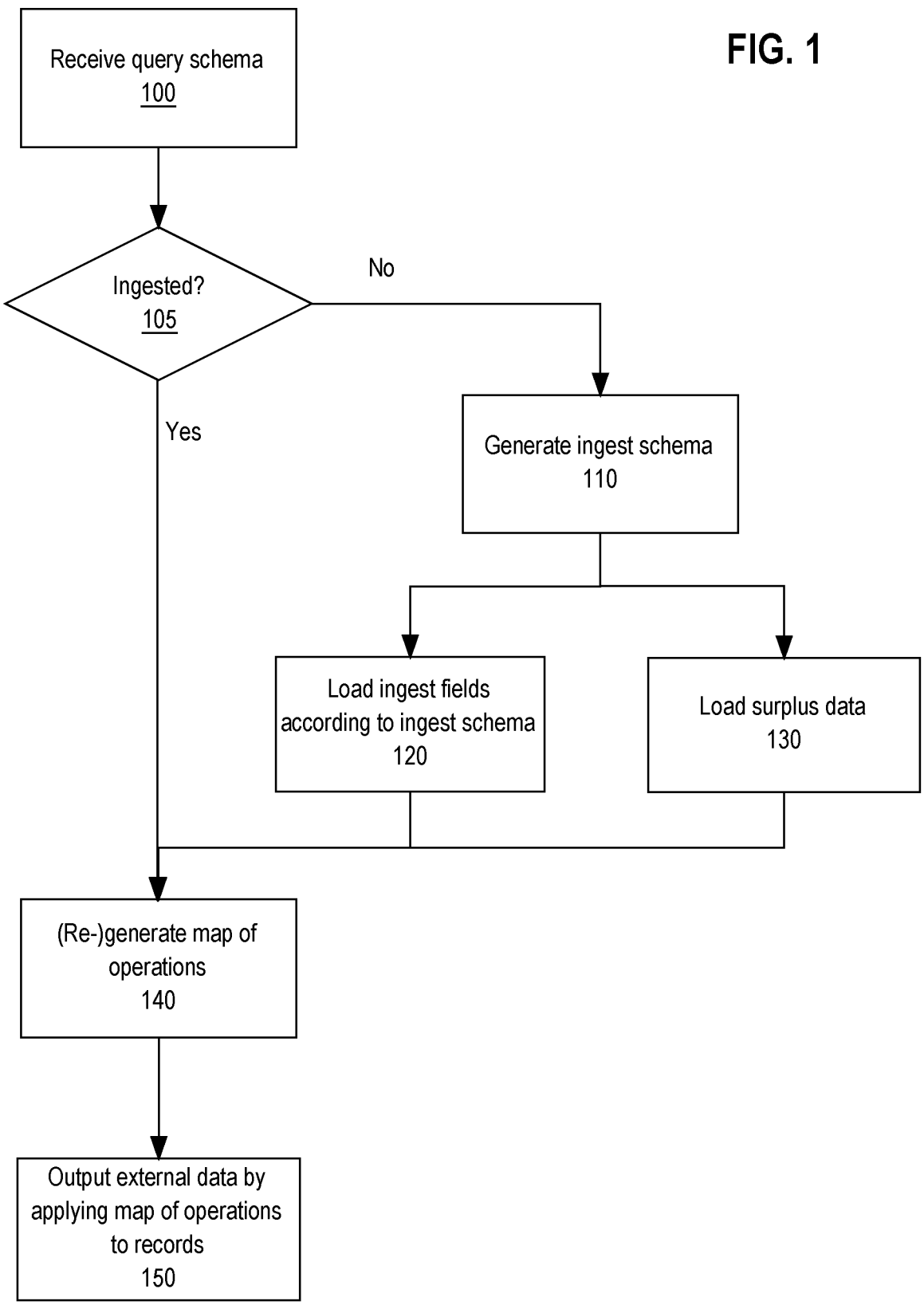
FIG. 1 is a block diagram that depicts a process for a DBMS to process external data according to a requested query schema, in an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Data in an external data source, such as an external file, may not be formatted in a format that is native to a DBMS. A client system of the DBMS may request the external data to be queried using a particular schema. The term "query schema" refers to a user-defined schema for external data, according to which a client system requests the DBMS to provide results for one or more queries of the data.

One example of a query schema is an "external table" definition. A DDL (Data Definition Language) statement may request the DBMS to define a database table for external data. The "external table" term refers to a DBMS database table defined based on a received DDL statement which includes a specification of one or more columns of the external table for the external data source.

One approach to query the external data source is for ETL of the DBMS to attempt to match the query schema. The query engine is aware of the requested query schema, such as the external table definition, and further becomes aware of the earlier ingested target data when the external data source was read. At this point using this approach, the query engine disregards the already ingested data and attempts to use the query schema to transform the data in the storage medium. In such an embodiment, if the query schema and the ingest schema do not match, the query engine has to generate an ingest schema that is the best possible match. The DBMS performs additional I/O operations of reading the external data source according to the newly generated ingest schema to be able to process queries that use the query schema. Such an approach not only incurs additional I/O operation cost and thus, wastes computational resources, but also fails to guarantee correct results because the generated schema is ad-hoc and after-the-fact and may not accurately match the query schema.

In one embodiment, the default ingest schema of the query engine of a DBMS is analyzed to determine the ingest schema rules to be used to parse the external data source. The parsed data may be arranged in one or more data fields, referred to herein as "ingest fields." When a DBMS parser parses the external data using the ingest schema rules, any information that is excluded from the resulting representation of the parsed data is referred herein to as "surplus data." The surplus data may include one or more data fields, referred to herein as "surplus fields".

In an embodiment, because the DBMS maintains the surplus fields/data in addition to the ingest fields, no new data input/output (I/O) operations need to be performed on the external data regardless of the degree of match between the query schema and the ingest schema. The DBMS may use the surplus data to supplement any difference between the requested arrangement of the result data according to the query schema and the arrangement, in which the data has been loaded into memory according to the ingest schema for processing. The DBMS performance is significantly improved by avoiding spending compute resources on the ETL for processing the external data according to new query schemas for already ingested external data sources.

In an embodiment, a map of operations is generated to convert ingested data from an ingest schema to a requested query schema. The map of operation defines a sequence of operations and data object(s), on which each operation is performed to generate data in the requested query schema. Once the map of operations is generated for the external data (e.g., an external data file), the external data is not required to be re-ingested, there is no need to perform another ETL. When a new query schema is requested for an already ingested external data source, the map of operations is re-generated to use a different combination of ingested fields and surplus data to match the new query schema. Accordingly, rather than performing a computational resource heavy ETL for each different query schema so that the ingest schema matches the query schema, the surplus data and the ingested fields are conformed to the query schema using techniques discussed here.

Query Schema

FIG. 1 is a block diagram that depicts a process for a DBMS to process external data according to a requested query schema, in an embodiment. A DBMS may receive multiple query schemas for the same external data source from one or more clients.

At block 100, the DBMS receives a query schema for an external data source from a client. The client may transmit to the DBMS an SQL statement that defines the query schema for the external data source. An example of such a DDL statement is the following:

```
CREATE TABLE address_ext_table ( FirstName VARCHAR2(30),
    LastName VARCHAR (30), Address VARCHAR (255)
ORGANIZATION EXTERNAL (
  TYPE ORACLE_LOADER
  DEFAULT DIRECTORY MY_DIRECTORY
  ACCESS PARAMETERS (
    RECORDS DELIMITED BY 0x'0A'
    FIELDS TERMINATED BY ',' OPTIONALLY ENCLOSED BY '"'
    ( first_name   CHAR(30),
      last_name    CHAR(30),
      address      CHAR(255)
    )
  )
  LOCATION (
    MY_DIRECTORY:'external.dmp'
  )
);
```

The statement declares an external table "address_ext_table" specifying three columns and the data types thereof, which are "FirstName," "LastName," and "Address" as character data types.

The EXTERNAL clause within the ORGANIZATION clause specifies that table "address_ext_table" is an external table having an external data source. The EXTERNAL clause includes various other clauses.

The TYPE clause specifies an external table type. The external table type dictates what data source properties need to be specified in the DDL statement. In an embodiment, any one of several external file types may be specified for an external table. These types include ORACLE_LOADER.

The ACCESS PARAMETERS clause specifies parameters that govern aspects of the Describe-Time and External-Granule Execution phases. In the DDL statement, the ACCESS PARAMETERS include the parameters that specify how the data is structured and thus accessed in the external data source. The parameters may specify the record delimiters, field delimiters, field names. This information may also be retrieved from the metadata of the external data source.

The LOCATION clause specifies a data source identifier to identify the data source of an external table.

Ingest Schema

Continuing with FIG. 1, at block 105, the DBMS determines whether the external data source has already been ingested. If the ingest has been performed, then the external data source is already associated with an ingest schema and one or more maps of operations to match to the corresponding query schemas. If there has been no prior request for the external data or to use the external data according to a query schema, the ETL for the external data source may not have been performed.

At block 110, if it has been determined that no ETL has been performed for the external data source, the DBMS generates an ingest schema for loading the external data source into the memory of the DBMS. In one embodiment, the ingested schema is generated based on the received query schema for the external data source. The query schema may specify the ingest schema for the external data source by indicating the fields in the external data source that are to be queried. Alternatively, the ingest schema is generated based on comparing the available fields and arrangement of the fields in the external data source to the columns and the arrangement of the columns in the requested query schema.

Additionally or alternatively, the ingest schema may be generated based on schema information that exists about the external data source. For example, eXtensible Markup Language (XML) based external data source may be associated with an XML Schema Definition (XSD) which can be the basis for the ingest schema. Other meta-data of the external data source may also be used for generation of the ingest schema for the external data source. For example for ".csv", the DBMS may ingest the external data into the memory assuming that the fields of the external data source are arranged as a Comma-Separated Value (CSV) list.

In an embodiment, in addition to generating ingest schema, surplus data to the ingest schema is identified. The surplus data may include the delimiters used to separate fields of the ingest schema or any field that has been omitted in the ingest schema itself but exists in the external data of the external data source.

Continuing with FIG. 1, at block 120, the DBMS loads at least a portion of the external data source according to the generated ingest schema. In addition to loading the ingest-fields, the DBMS loads the surplus data including delimiter information for the ingest columns, at block 130, in an embodiment. The loading of ingest/surplus fields may include retrieving and processing the metadata for the external data source, determining memory address offsets for each of the fields and/or copying the portions of the external data to fast-access memory of the DBMS.

Generating Map of Operations

At block 140, the DBMS generates a map of operations to be performed on records of the external data that have been ingested. The map of operations includes inputs to operators and sequence of the operations to be performed by the operators. The map of operations may be represented by a directed acyclic graph (DAG), where each node represents an operator and arrows denote the flow of data such as input or output data for the operators. FIGS. 2A-D are directed acyclic graphs that represent examples of maps of operations, in various embodiments.

Figure 3:
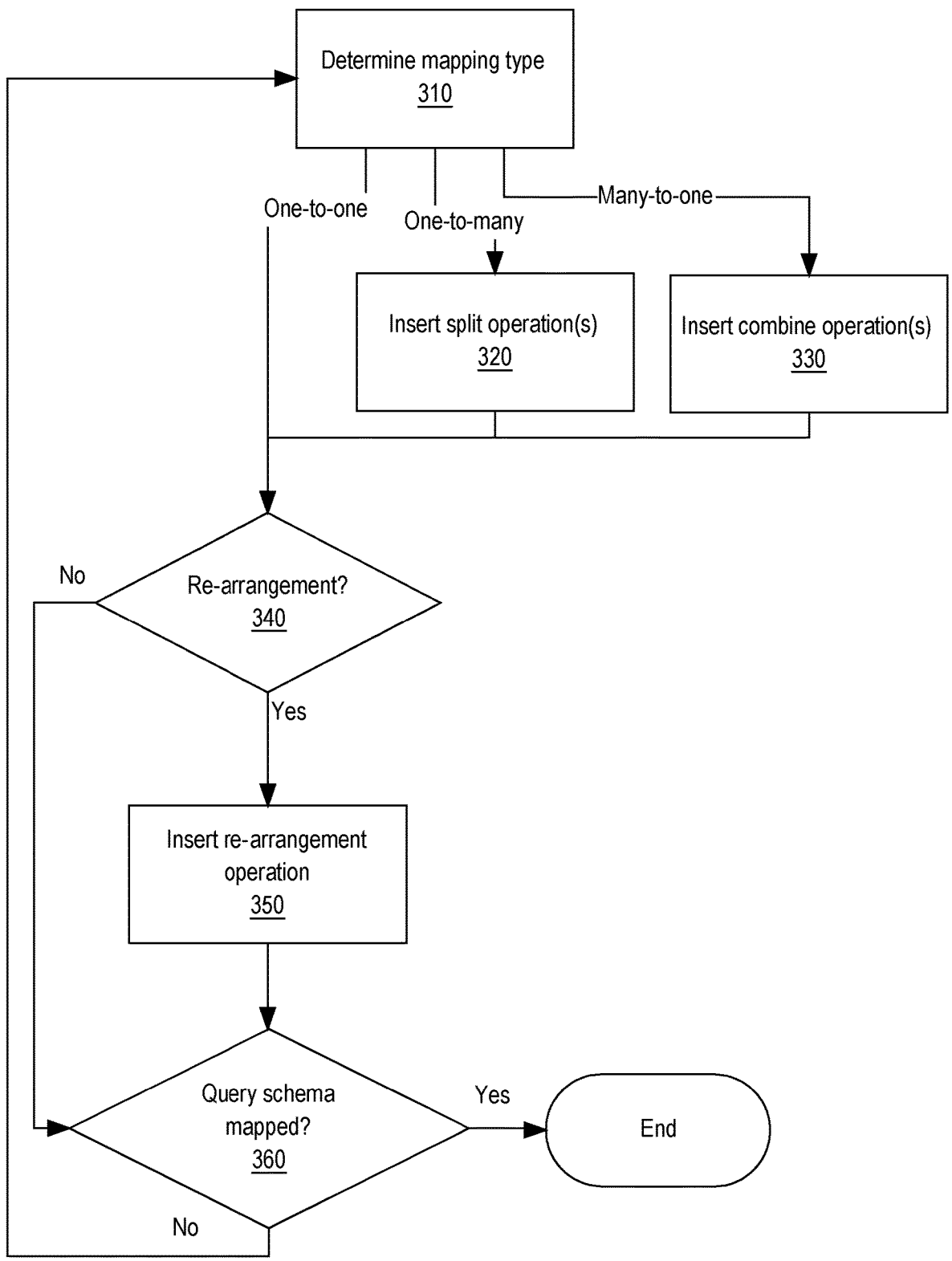
FIG. 3 is a block diagram that depicts a process for generating a map of operations, in an embodiment.

FIG. 3 is a block diagram that depicts a process for generating a map of operations, in an embodiment. At block 310, the process determines the type of mapping that is to be performed between input data and output data. Input data may be one or more originally ingested fields, surplus data or any intermediate output data from another operator. The output data is one or more columns of the query schema or any input data to another operator.

The type of mapping may be one-to-one such that input data directly corresponds to output data. For example, the DBMS may determine that a single ingested or surplus field corresponds to a single column defined by the query schema. In an embodiment in which an ingested schema is first generated based on the first requested query schema for an external data source, the mapping type is more likely to be one-to-one between most external fields and requested columns. In such an embodiment, the DBMS attempts to match each column in the requested query schema to a corresponding field in the external data source, when ingesting the external data source. In an embodiment, the DBMS selects a column from the query schema to match a field from the external data source based on the DDL statement defining the query schema. If the match is successful, a one-to-one mapping is selected for the matched column and the field.

Figure 2A:
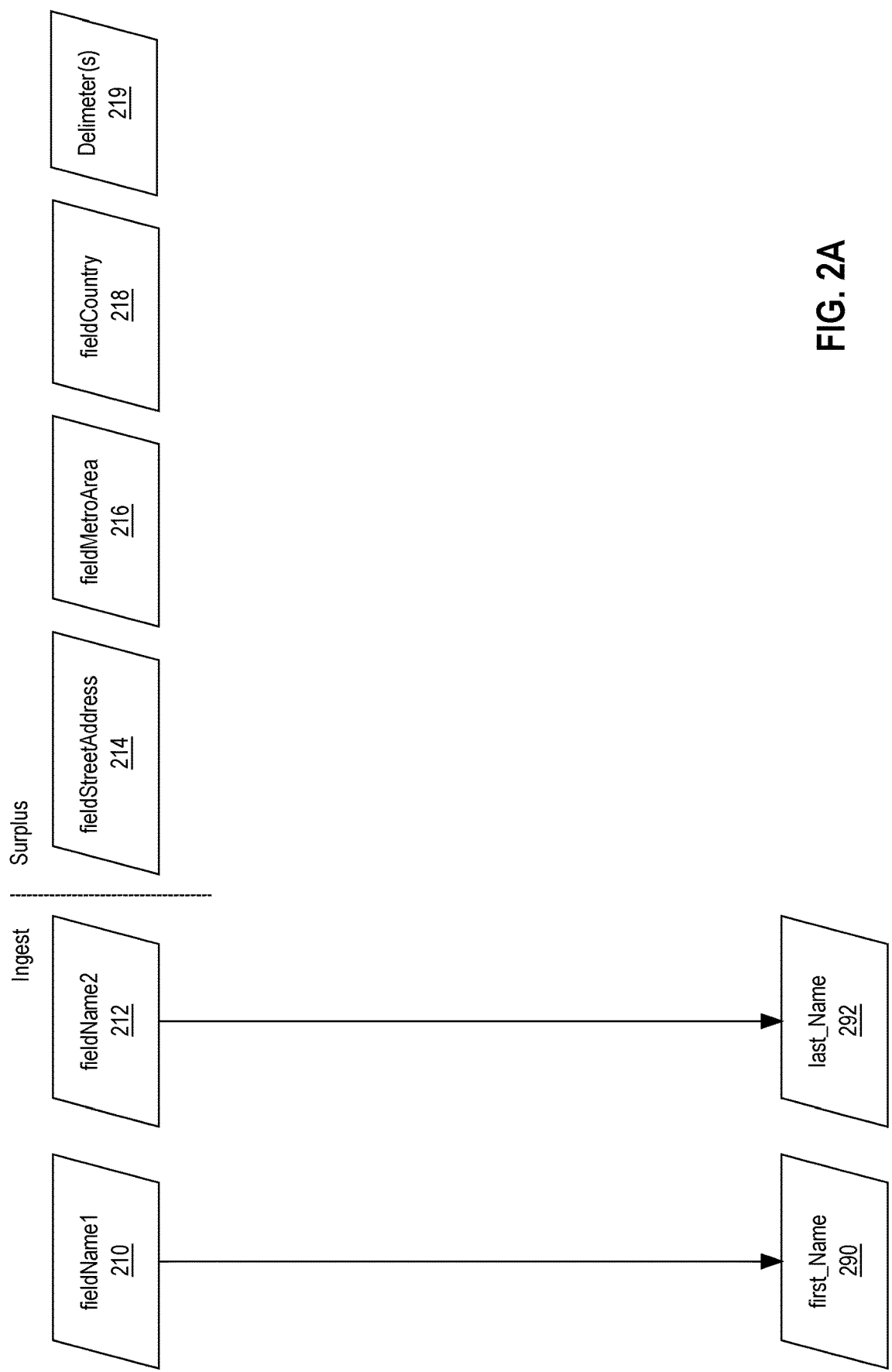
FIGS. 2A-D are directed-acyclic graphs (DAGs) that represent examples of maps of operations, in various embodiments.

FIG. 2A is a DAG for mapping a query schema that defines columns first_Name 290 and last_Name 292 to an external data source that contains shipping labels, as an example. The external data source has two name fields fieldName1 210 and fieldName2 212. The DBMS determines, during the ingest, that fieldName1 210 and fieldName2 212 corresponds to the query schema's first_Name 290 and last_Name 292, respectively. Thus, the DBMS generates a one-to-one map of operations as depicted in FIG. 2A, in which first_Name 290 is mapped to fieldName1 210, and last_Name 292 is mapped to fieldName2 212. The DBMS may load into fast access memory at least a portion of the field values for theses mapped fields to generate columns for first_Name 290 and last_Name 292 of the query schema.

In addition to loading the mapped fields, the DBMS identifies and loads other fields in the external data source that are not part of the generated ingest schema, such as fieldStreetAddress 214, fieldMetroArea 216 and fieldCountry 218. For example, if the external data source containing shipping labels is a CSV file, the DBMS continues to identify all the comma-separated field names in the file. The DBMS may also load delimiter information 219 to ensure no information is lost from the external data source. For the CSV-based external data file, the delimiter information may contain the comma characters (and their placement) that are used to identify the field values in the external data source. Based on the loaded surplus fields and the delimiter information, the DBMS can generate different maps of operations for other query schemes without re-loading the external data source.

Accordingly, if, at block 100 of FIG. 1, a new query schema is received for the same external data source, for which the ingested schema has been already generated and the external data loaded, then no new ingest schema is generated by the DBMS. Rather, at block 105, the process transitions to block 140 to re-generate a map of operations for the new query schema to perform the new arrangement of operations on the previously loaded external data.

Figure 2B:
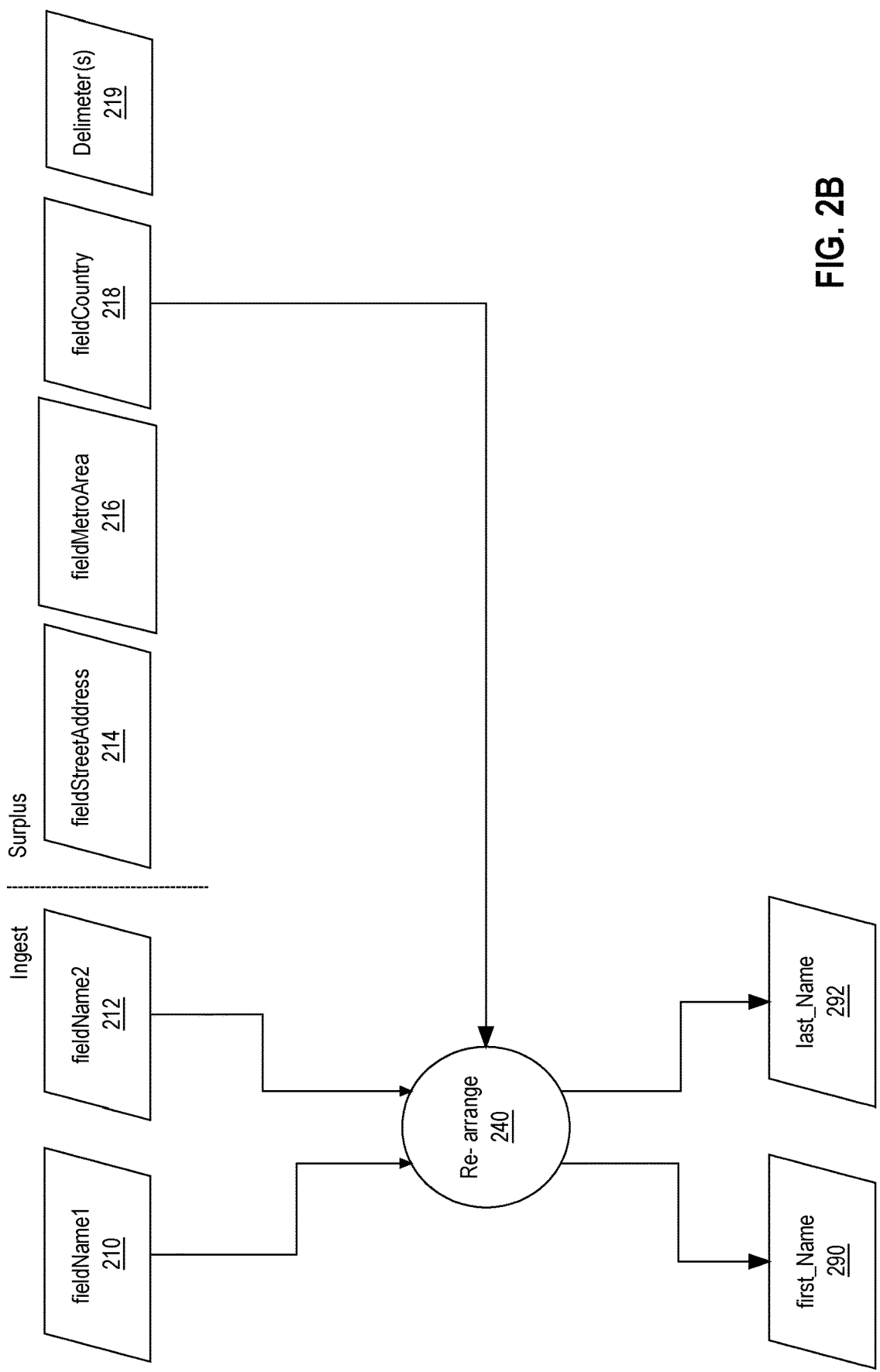

For example, FIG. 2B depicts another DAG but for the same shipping label data source that was previously loaded and for which a map of operations has been generated as depicted in FIG. 2A.

In contrast with the query schema of FIG. 2A, the new query schema requests the first_Name 290 and last_Name 292 columns to contain "first name" and "last name". The DBMS may determine that fieldName1 210 and fieldName2 212 contain first names for some countries and last names for other countries. Accordingly, in the new query schema, the arrangement of first name and last name depends on the country.

The initial ingest schema of FIG. 2A contained only fieldName1 and fieldName2 and failed to include the field that represents the country of the record, fieldCountry 218. Since the DBMS has already loaded fieldCountry 218 as part of the surplus data when loading the shipping label CVS file, the DBMS avoids regenerating the ingest schema and loading the shipping label data file anew.

Rather, continuing with FIG. 1, the DBMS proceeds to block 140 to re-generate a map of operations for the new query schema, in an embodiment. FIG. 3 may provide a sample process for regenerating a map of operation for the new schema. Similar to FIG. 2A, at block 310, the process determines that there is a one-to-one mapping between columns requested by the new query schema and the external data fields. At block 340, the process determines whether a re-arrangement of any field of the external data source is needed. For FIG. 2A's query schema no such re-arrangement was needed, thus the map of operation of FIG. 2A reflects no additional operator.

On the other hand, the DBMS may determine that for the new query schema a re-arrangement operator is necessary at block 340. Thus, the process proceeds to block 350 and generates a re-arrangement operator for the new map of operations. The inputs for the operator may include one or more ingest columns and/or surplus fields of the external data source that were not part of the original ingest schema.

FIG. 2B depicts an example DAG for the map of operations that includes the generated re-arrangement operator 240 with an additional input of fieldCountry 218. The value of the additional input field, fieldCountry 218, determines whether fieldName1 210 and fieldName2 212 are swapped and then mapped to first_Name 290 and last_Name 292, respectively, or are directly mapped without swapping.

Continuing with FIG. 3 for generating or regenerating a map of operations, at block 310, the process determines that the mapping between an external data field and query schema columns is one-to-many, in an embodiment. If so, at block 320, a split operator is inserted to split a loaded external data field, which could be an ingest column or a surplus column, into multiple outputs.

The output of split operator may be directly mapped to the query schema columns or to inputs of other one or more operators, if further operator(s) are needed to map the query schema columns to the fields of the external data file. For example, at block 340, the process may determine that a re-arrangement operator is needed and proceed to insert a re-arrangement operator in the map of operations that takes as an input the output of the split operator. Even if, no re-arrangement operator is needed for the output of the split operator, at block 360, the DBMS determines whether additional operators need to be inserted. If so, the process proceeds back to block 310 to determine the new mapping type for the outputs of the split operation.

Figure 2C:
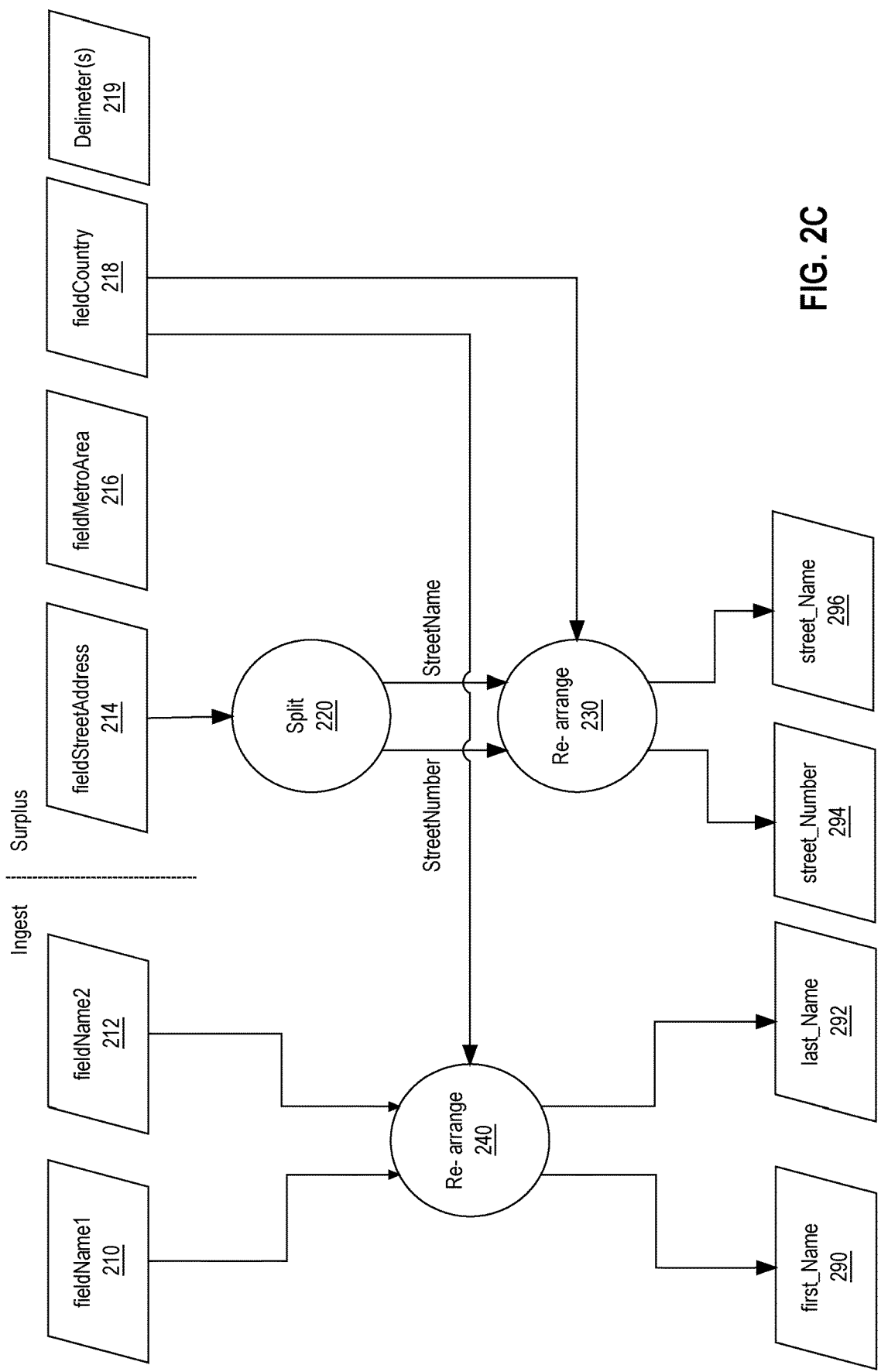

FIG. 2C is an example DAG for a map of operations that provides an example of a split and a re-arrangement operator used together, in an embodiment. For a single external field, the query schema in the example specifies separate columns. The DBMS may determine the relationship between the external field and the query columns based on the query statement (such as a DDL statement) that specifies the query schema. Alternatively, the DBMS may itself determine the fields to be mapped to the requested column and the delimiter information from the metadata of the external data source.

In FIG. 2C, the DBMS determines that fieldStreetAddress 214 is mapped to multiple query columns, street_Number 294 and street_Number 296. Accordingly, the DBMS inserts split operator 220 to split fieldStreetAddress 214 into an output street number value and an output street name value. Because the street number and the street name may be arranged differently for different countries. The DBMS inserts re-arrangement operator 230 to swap the output of split operator 220 according to corresponding country values in fieldCountry 218. The output of re-arrangement operator is the columns specified in the query schema: street_Number 294 and street_Name 296.

Continuing with FIG. 3 for generating or regenerating a map of operations, at block 310, the process determines that the mapping between external data fields and a query schema column is many-to-one, in an embodiment. If so, at block 330, a combine operator is inserted to combine multiple external data fields, such as ingested or surplus, into a single output.

In an embodiment, in which the original (ingest or surplus) data fields of the external data source are to be combined, the DBMS may combine the delimiters that separated the data fields in the original records of the external data source. Because the DBMS has recorded the delimiter information while ingesting the external data source, the DBMS may use the recorded delimiter information to reconstruct the exact way the data fields were combined in the external data source.

The output of combine operator may be directly mapped to the query schema columns or to inputs of other one or more operators, if further operator(s) are needed to map the query schema columns to the fields of the external data file. For example, at block 340, the process may determine that a re-arrangement operator is needed and proceed to insert a re-arrangement operator in the map of operations that takes as an input the output of the combine operator. Even if, no re-arrangement operator is needed for the output of the combine operator, at block 360, the DBMS determines whether additional operators need to be inserted. If so, the process proceeds back to block 310 to determine the new mapping type for the outputs of the combine operation.

Figure 2D:
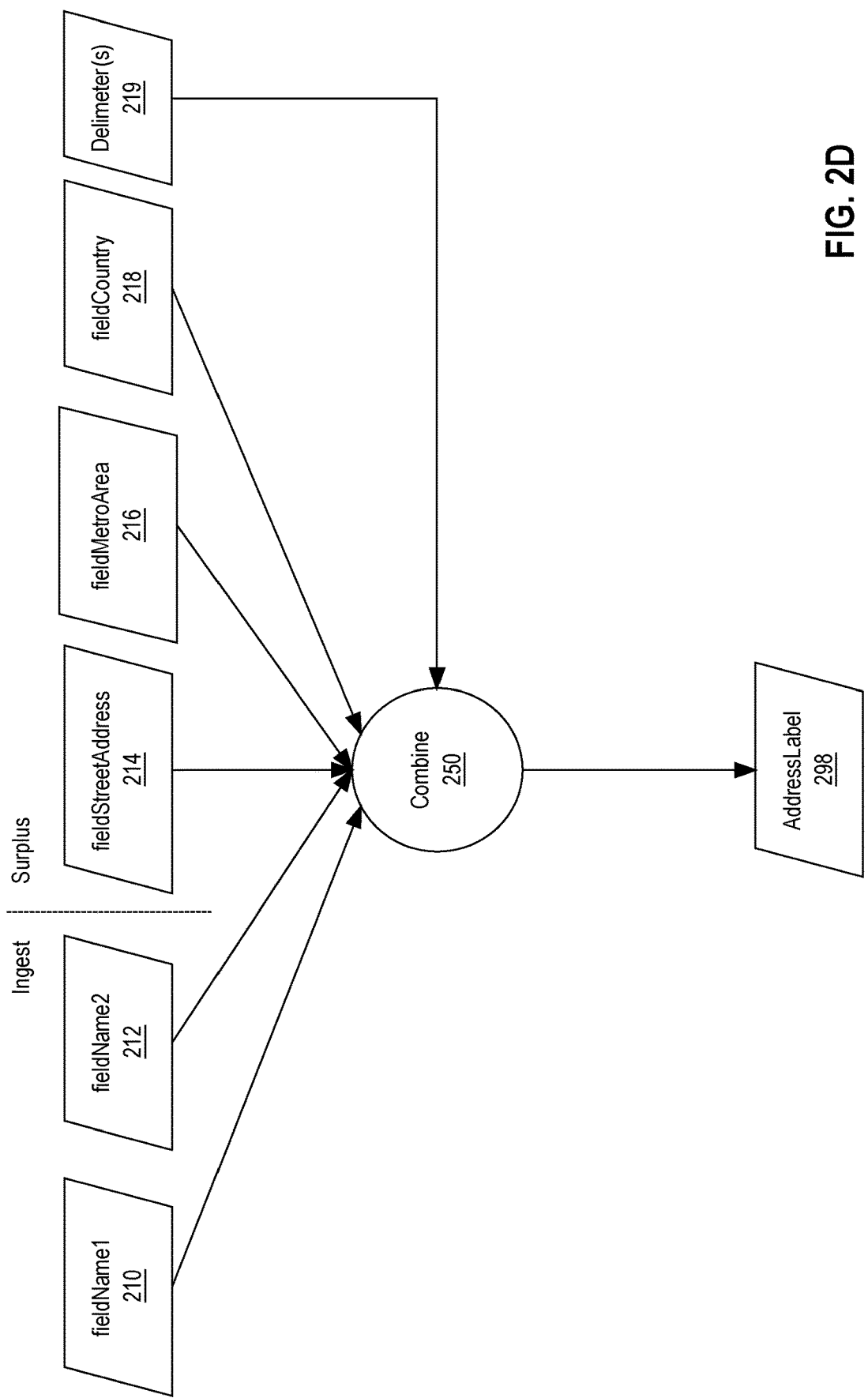

FIG. 2D is a DAG for a map of operations that provides an example of a combine operator, in an embodiment. The query schema in the example specifies a single column for a full shipping label that maps to multiple external fields of the external data source. The DBMS may determine the relationship between the external fields and the query column based on the query statement (such as a DDL statement) that specifies the query schema. Alternatively, the DBMS may itself determine the fields to be mapped to the requested column and the delimiter information from the metadata of the external data source.

In FIG. 2C, the DBMS determines that external fields, fieldName1 210, fieldName2 212, fieldStreetAddress 214, fieldMetroArea 216, fieldCountry 218 and delimiter information 219, are mapped to a single query column, AddressLabel 298. Accordingly, to reconstruct the full shipping label as an example, the DBMS inserts combine operator 250 that combines fieldName1 210, fieldName2 212, fieldStreetAddress 214, fieldMetroArea 216, fieldCountry 218 and delimiter information 219. The output of the combine operator is exactly the content of each record that was originally ingested by the DBMS. Thus, although the DBMS has already ingested the external data source, the DBMS may reconstruct the exact records of the external data source, AddressLabel 298, without re-ingesting the external data source.

Continuing with FIG. 3, at block 360, the DBMS determines whether the query schema is mapped or more mapping is to be performed. If any of columns defined by the query schema are not mapped, the DBMS repeats blocks 310 through 360 to map all the columns defined by the query schema.

In an embodiment, other types of mapping operators are inserted to performed the mapping of the ingest and surplus data to a query schema. Other example types of mapping operators include regular expression operators, string truncation, appendment, and replacement.

Generating Result Set

Continuing with FIG. 1, in response to receiving a query, the DBMS generates a result set based on the map of operations at block 150. The input data is read from the file or memory and fed to the operators of the map of operations. The operations of the map are performed and the result data set that conforms to the query schema is returned.

The map of operation may map multiple external records of the external data source per a query row of the result set, or vice versa. In an embodiment, in which there are multiple external records per a query row, an operation may be performed multiple time with different inputs before an output is produced. An operator in such an operation may indicate whether its output is ready or not.

In an embodiment in which there are multiple query rows per an external row, the operator generates output on each read, but only consumes new input after the operator has performed the operation for the previous input. Such an operator may indicate that the operator's input is ready to receive a new input or not.

The DBMS may use the indications for ready input or output to determine which operations may be performed and what data can be read. The DBMS may use the indications for input of operators coupled to the external data source records to determine whether to read the next external record or not. Similarly, the DBMS may use the indications for the output of operators coupled to query schema columns to determine whether it is ready to return the next query row of the result set.

Database Management System Overview

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL," the invention is not limited to just this particular database query language and may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number of nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an embodiment, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 4:
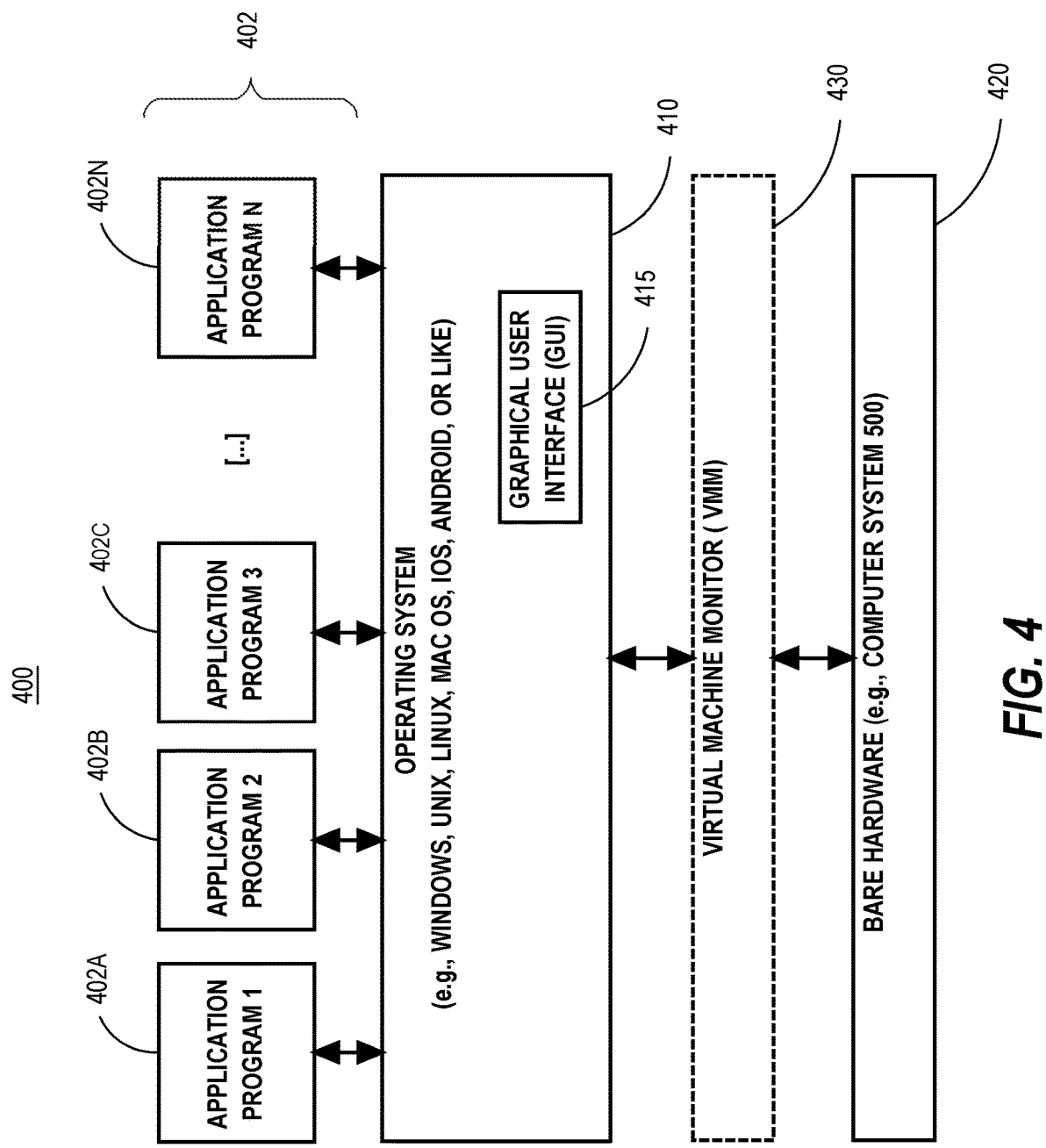
FIG. 4 is a block diagram of a basic software system, in one or more embodiments.
Figure 5:
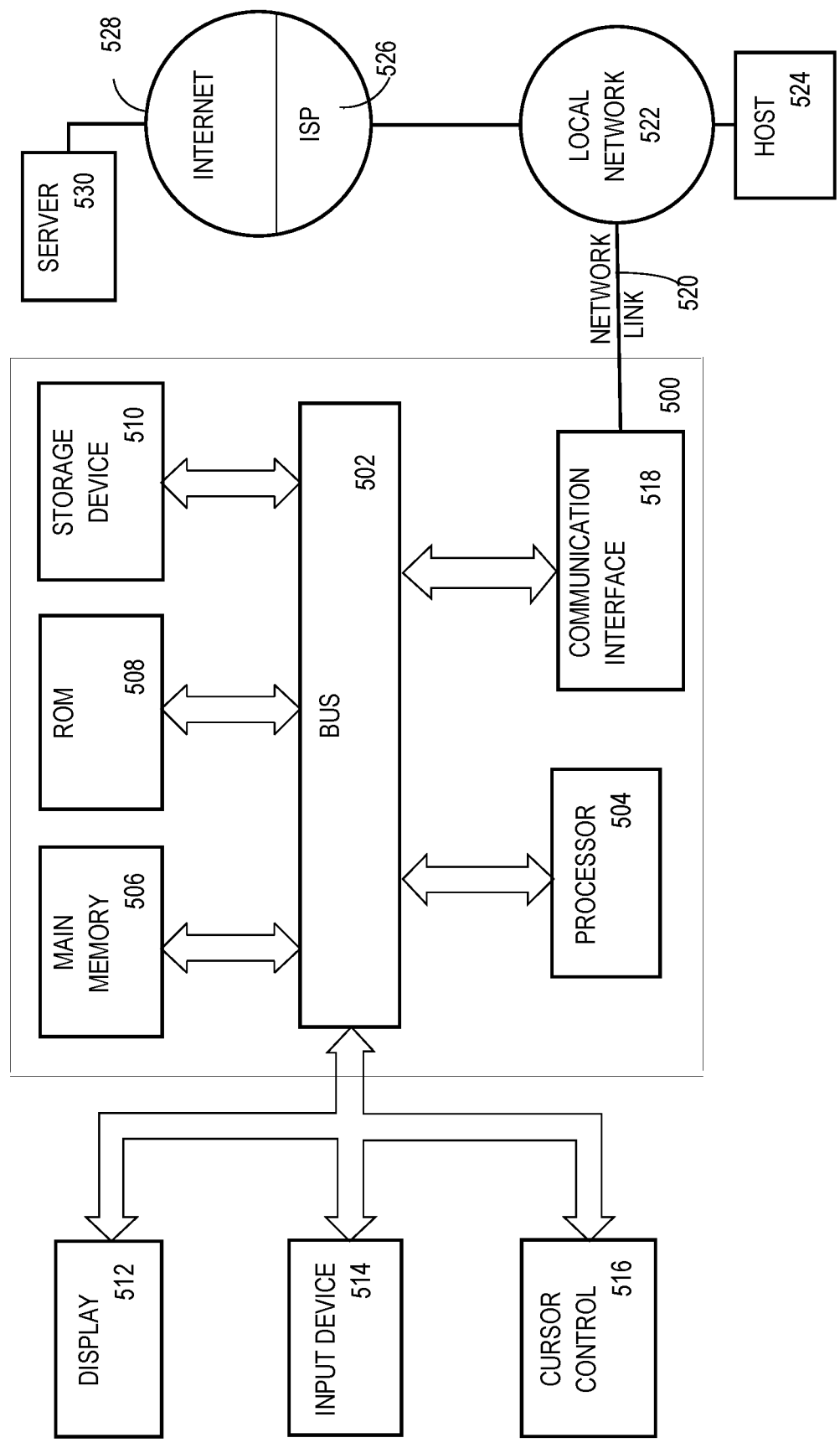
FIG. 5 is a block diagram that illustrates a computer system upon which an embodiment of the invention may be implemented.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or another online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or another dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal, and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526, in turn, provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510 or other non-volatile storage for later execution.

Computing Nodes and Clusters

A computing node is a combination of one or more hardware processors that each share access to a byte addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving, at a database management system (DBMS), a first query schema that specifies an external data source and one or more client-defined columns to arrange queried data from data fields of the external data source;
generating an ingest schema for the queried data of the external data source, the ingest schema specifying one or more ingest data fields from the data fields of the external data source to be mapped to the one or more client-defined columns;
identifying surplus data in the external data source, which has not been specified by the ingest schema and different from the queried data defined by the first client-requested query schema;
in addition to ingesting, into the DBMS, the one or more ingest data fields from the external data source, ingesting the surplus data from the external data source;
in response to receiving a query according to a second query schema, that is different from the first query schema, generating a result set that is based at least in part on the surplus data of the external data source.

2. The method of claim 1, wherein the surplus data includes surplus data fields that are different from the ingest data fields of the ingest schema.

3. The method of claim 1, wherein the surplus data includes delimiter information for the data fields of the external data source.

4. The method of claim 1, wherein the ingest schema is based on metadata of the external data source.

5. The method of claim 1, wherein the one or more client-defined columns are one or more first client-defined columns, and the query is a first query, the method further comprising:
receiving, at the DBMS, the second query schema that specifies the same external data source and one or more second client-defined columns to arrange new queried data from the external data source;
without re-generating a new ingest schema and without any other ingesting, based on the one or more ingest data fields and the surplus data, generating a map of operations, the map of operations comprising one or more operators that transform the one or more ingest data fields and the surplus data into the one or more second client-defined columns.

6. The method of claim 5, wherein the map of operations is a second map of operations, and the one or more operators are one or more second operators, and the method further comprising:
before generating the second map of operations comprising the one or more second operators, generating a first map of operations;
wherein the first map of operations comprises one or more first operators that are different from the one or more second operators and that transform the one or more ingest data fields into the one or more first client-defined columns of the first query schema.

7. The method of claim 5, wherein the one or more operators include a split operator, a combine operator, or a re-arrangement operator.

8. The method of claim 5, wherein generating the map of operations is based on determining one or more types of mappings between the data fields of the external data source and the one or more second client-defined columns of the second query schema.

9. The method of claim 5, wherein generating the result set includes:
performing a read of a record of the data fields in the external data source;
providing corresponding input data from the data fields to the one or more operators of the map of operations;
performing one or more operations of the one or more operators of the map of operations;
based on output data of the one or more operators, generating at least a portion of a row in the result set.

10. The method of claim 9, wherein the read of the record of the data fields in the external data source is performed based on an indicator that indicates a new record can be read, and wherein the generating at least the portion of the row in the result set is performed based on an indicator that indicates a new result row can be written.

11. One or more non-transitory computer-readable media storing instructions, wherein the instructions include a sequence of instructions, which when executed by one or more processors causes:
receiving, at a database management system (DBMS), a first query schema that specifies an external data source and one or more client-defined columns to arrange queried data from data fields of the external data source;
generating an ingest schema for the queried data of the external data source, the ingest schema specifying one or more ingest data fields from the data fields of the external data source to be mapped to the one or more client-defined columns;
identifying surplus data in the external data source, which has not been specified by the ingest schema and different from the queried data defined by the first client-requested query schema;
in addition to ingesting, into the DBMS, the one or more ingest data fields from the external data source, ingesting the surplus data from the external data source;
in response to receiving a query according to a second query schema, that is different from the first query schema, generating a result set that is based at least in part on the surplus data of the external data source.

12. The one or more non-transitory computer-readable media of claim 11, wherein the surplus data includes surplus data fields that are different from the ingest data fields of the ingest schema.

13. The one or more non-transitory computer-readable media of claim 11, wherein the surplus data includes delimiter information for the data fields of the external data source.

14. The one or more non-transitory computer-readable media of claim 11, wherein the ingest schema is based on metadata of the external data source.

15. The one or more non-transitory computer-readable media of claim 11, wherein the one or more client-defined columns are one or more first client-defined columns, the query is a first query, and wherein the sequence of instructions further includes instructions, which when executed by the one or more processors cause:
receiving, at the DBMS, the second query schema that specifies the same external data source and one or more second client-defined columns to arrange new queried data from the external data source;
without re-generating a new ingest schema and without any other ingesting, based on the one or more ingest data fields and the surplus data, generating a map of operations, the map of operations comprising one or more operators that transform the one or more ingest data fields and the surplus data into the one or more second client-defined columns.

16. The one or more non-transitory computer-readable media of claim 15, wherein the map of operations is a second map of operations, and the one or more operators are one or more second operators, and wherein the sequence of instructions further includes instructions, which when executed by the one or more processors cause:
before generating the second map of operations comprising the one or more second operators, generating a first map of operations;
wherein the first map of operations comprises one or more first operators that are different from the one or more second operators and that transform the one or more ingest data fields into the one or more first client-defined columns of the first query schema.

17. The one or more non-transitory computer-readable media of claim 15, wherein the one or more operators include a split operator, a combine operator, or a re-arrangement operator.

18. The one or more non-transitory computer-readable media of claim 15, wherein the sequence of instructions further includes instructions, which when executed by the one or more processors cause generating the map of operations is based on determining one or more types of mappings between the data fields of the external data source and the one or more second client-defined columns of the second query schema.

19. The one or more non-transitory computer-readable media of claim 15, wherein the sequence of instructions further includes instructions, which when executed by the one or more processors cause:
performing a read of a record of the data fields in the external data source;
providing corresponding input data from the data fields to the one or more operators of the map of operations;
performing one or more operations of the one or more operators of the map of operations;
based on output data of the one or more operators, generating at least a portion of a row in the result set.

20. The one or more non-transitory computer-readable media of claim 19, wherein the read of the record of the data fields in the external data source is performed based on an indicator that indicates a new record can be read, and wherein the generating at least the portion of the row in the result set is performed based on an indicator that indicates a new result row can be written.

* * * * *

UNITED STATES PATENT AND TRADEMARK OFFICE
CERTIFICATE OF CORRECTION

PATENT NO. : 11,074,248 B2
APPLICATION NO. : 16/371073
DATED : July 27, 2021
INVENTOR(S) : Hariharasubrahmanian et al.

It is certified that error appears in the above-identified patent and that said Letters Patent is hereby corrected as shown below:

In the Drawings

On sheet 2 of 8, in FIG. 2A, under Reference Numeral 219, Line 1, delete "Delimeter(s)" and insert -- Delimiter(s) --, therefor.

On sheet 3 of 8, in FIG. 2B, under Reference Numeral 219, Line 1, delete "Delimeter(s)" and insert -- Delimiter(s) --, therefor.

On sheet 3 of 8, in FIG. 2B, under Reference Numeral 240, Line 1, delete "Re- arrange" and insert -- Re-arrange --, therefor.

On sheet 4 of 8, in FIG. 2C, under Reference Numeral 219, Line 1, delete "Delimeter(s)" and insert -- Delimiter(s) --, therefor.

On sheet 4 of 8, in FIG. 2C, under Reference Numeral 230, Line 1, delete "Re- arrange" and insert -- Re-arrange --, therefor.

On sheet 4 of 8, in FIG. 2C, under Reference Numeral 240, Line 1, delete "Re- arrange" and insert -- Re-arrange --, therefor.

On sheet 5 of 8, in FIG. 2D, under Reference Numeral 219, Line 1, delete "Delimeter(s)" and insert -- Delimiter(s) --, therefor.

In the Specification

In Column 2, Line 4, delete "embodiments;" and insert -- embodiments. --, therefor.

In Column 6, Line 28, delete "CVS" and insert -- CSV --, therefor.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,074,248 B2

In Column 12, Line 41, delete "DbaaS" and insert -- DBaaS --, therefor.

In Column 15, Line 27, delete "system" and insert -- system. --, therefor.